United States Patent [19]
Bingham et al.

[11] Patent Number: 5,680,394
[45] Date of Patent: Oct. 21, 1997

[54] TIME DIVISION DUPLEXED HIGH SPEED DATA TRANSMISSION SYSTEM AND METHOD

[75] Inventors: John A. C. Bingham, Palo Alto; Po Tong, Fremont, both of Calif.

[73] Assignee: Amati Communications Corporation, San Jose, Calif.

[21] Appl. No.: 501,250

[22] Filed: Jul. 11, 1995

[51] Int. Cl.⁶ .................. H04J 3/06; H04L 5/14
[52] U.S. Cl. ........................... 370/294; 370/503
[58] Field of Search ................. 370/19–21, 24, 370/29, 32, 50, 100.1, 101, 93, 94.3, 95.3, 105.1, 276, 280, 294, 279, 420, 421, 442, 446, 498, 503; 375/356, 222; 455/5.1, 6.1; 348/6, 7, 13, 14; 359/113, 123, 137, 158, 167

[56] References Cited

U.S. PATENT DOCUMENTS

| | | |
|---|---|---|
| 4,438,511 | 3/1984 | Baran . |
| 4,484,028 | 11/1984 | Kelley et al. .................. 370/29 |
| 4,644,534 | 2/1987 | Sperlich ......................... 370/24 |
| 5,172,374 | 12/1992 | De Cristofaris et al. ........ 370/94.3 |
| 5,285,474 | 2/1994 | Chow et al. . |
| 5,315,584 | 5/1994 | Savary et al. .................. 370/73 |
| 5,410,343 | 4/1995 | Coddington et al. ........... 348/14 |
| 5,499,241 | 3/1996 | Thompson ...................... 370/73 |

FOREIGN PATENT DOCUMENTS

| | | |
|---|---|---|
| 63-092135 | 4/1988 | Japan . |
| 2 252 882 | 8/1992 | United Kingdom . |
| WO 95/34149 | 12/1995 | WIPO . |

OTHER PUBLICATIONS

Sorbara, et al., Constellation Time Division Multiplexing For The 6 Mb/s ADSL, 1994, IEEE.

*Primary Examiner*—Douglas W. Olms
*Assistant Examiner*—Chau T. Nguyen
*Attorney, Agent, or Firm*—Hickman Beyer & Weaver

[57] ABSTRACT

A method of coordinating very high speed bi-directional data transmissions between a central unit and a plurality of remote units over distinct twisted pair transmission lines that share a binder is described. Specifically, periodic synchronized upstream and downstream communication periods are provided that do not overlap with one another. The upstream and downstream communication periods for all of the wires that share a binder are synchronized. With this arrangement, all of the very high speed transmissions within the same binder are synchronized and time division duplexed such that downstream communications are not transmitted at times that overlap with the transmission of upstream communications. In some embodiments, quiet periods are provided to separate the upstream and downstream communication periods. The described invention may be used in conjunction with a wide variety of modulation schemes, including both multi-carrier and single carrier transmission schemes. It is backwards compatible with existing systems and has particular advantages in very high performance systems.

43 Claims, 6 Drawing Sheets

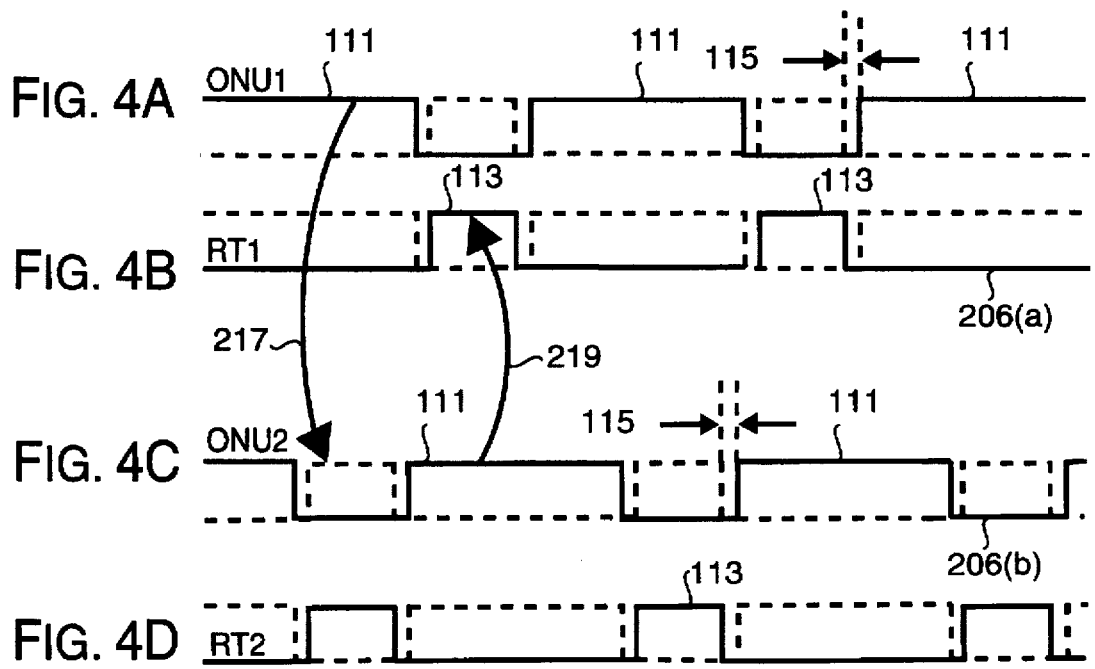
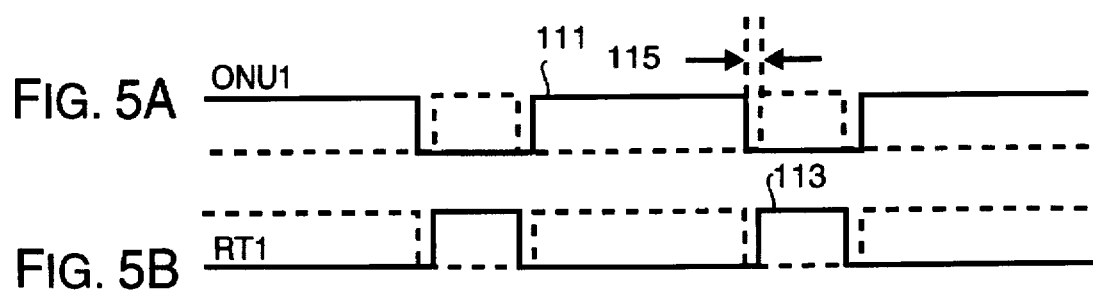
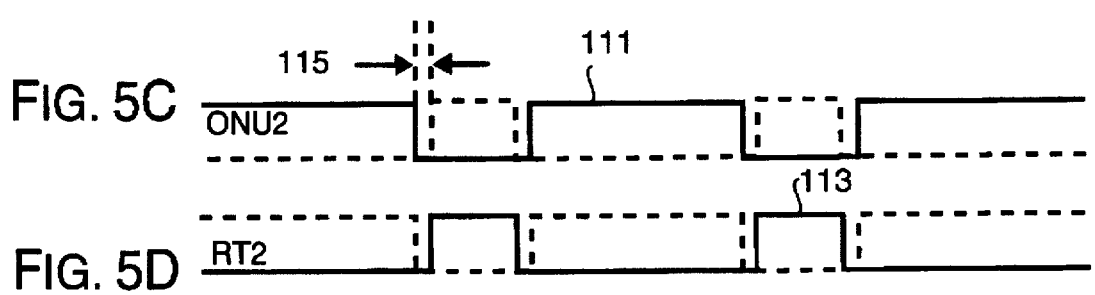

TIME DIVISION DUPLEXED HIGH SPEED DATA TRANSMISSION SYSTEM AND METHOD

BACKGROUND OF THE INVENTION

The present invention relates generally to very high speed bi-directional digital data transmission systems. More particularly, a time division, duplexed data transmission scheme that is well adapted for transmissions over bundled transmission wires such as subscriber lines is disclosed.

The Alliance For Telecommunications Information Solutions (ATIS), which is a group accredited by the ANSI (American National Standard Institute) Standard Group, has recently finalized a discrete multi tone based standard for the transmission of digital data over Asymmetric Digital Subscriber Lines (ADSL). The standard is intended primarily for transmitting video data over ordinary telephone lines, although it may be used in a variety of other applications as well. The North American Standard is referred to as the ANSI T1.413 ADSL Standard and is incorporated herein by reference. Transmission rates under the ADSL standard are intended to facilitate the transmission of information at rates of at least 6 million bits per second (i.e., 6+Mbit/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFFT), typical values for the number of available sub-channels (tones) are integer powers of two, as for example, 128, 256, 512, 1024 or 2048 sub-channels.

The Asymmetric Digital Subscriber Lines standard also defines the use of a reverse signal at a data rate in the range of 16 to 800 Kbit/s. The reverse signal corresponds to transmission in an upstream direction, as for example, from the remote location to the central office. Thus, the term Asymmetric Digital Subscriber Line comes from the fact that the data transmission rate is substantially higher in the downstream direction than in the upstream direction. This is particularly useful in systems that are intended to transmit video programming or video conferencing information to a remote location over the telephone lines. By way of example, one potential use for the systems allows residential customers to obtain video information such as movies over the telephone lines or cable rather than having to rent video cassettes. Another potential use is in video conferencing.

Because both downstream and upstream signals travel on the same pair of wires (that is, they are duplexed) they must be separated from each other in some way. The method of duplexing used in the ADSL standard is Frequency Division Duplexing (FDD). In frequency division duplexed systems, the upstream and downstream signals occupy different frequency bands and are separated at the transmitters and receivers by filters.

At the time of this writing, ANSI is just beginning work on the next generation subscriber line based transmission system, which is referred to as the VDSL (Very High Digital Subscriber Line) standard. The VDSL standard is intended to facilitate transmission rates of at least 25.96 Mbit/s and preferably at least 51.92 Mbit/s in the downstream direction.

To achieve these rates, the transmission distance over twisted pair phone lines must generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer premise is standard unshielded twisted pair (UTP) telephone lines.

A number of modulation schemes have been proposed for use in the VDSL and FTTC standards (hereinafter VDSL/FTTC). At the time of this writing, all of the proposed VDSL/FTTC modulation schemes utilize frequency division duplexing of the upstream and downstream signals. By way of example, one proposed multi-carrier solution utilizes frequency division duplexed discrete multi tone signals with the upstream communications being accommodated at the lower frequency bands and the downstream communications being accommodated at the higher frequency bands. This approach is illustrated schematically in FIG. 2(a). Another proposed approach contemplates frequency division duplexed carrierless amplitude and phase modulated (CAP) signals with the upstream communications being accommodated at the higher frequency bands and the downstream communications being accommodated at the lower frequency bands. This approach is schematically illustrated in FIG. 2(b).

However, both of these approaches have potential drawbacks. Most notably, in applications that have relatively longer loop lengths, the higher frequency signals are significantly attenuated which makes the transmissions much more susceptible to noise and hinders the permissible transmission rates. Indeed in systems which transmit upstream signals at higher frequency bands, there is a real risk of losing the upstream signals altogether, which is not acceptable. In asymmetric applications, there is also an increased risk that narrow band noise will significantly degrade the system's performance. Accordingly, an improved method of coordinating very high speed data transmissions (i.e. those having the capability of transmitting at least ten million bits per second over each transmission line) would be desirable.

SUMMARY OF THE INVENTION

To achieve the foregoing and other objects and in accordance with the purpose of the present invention, a method of coordinating very high speed bi-directional data transmissions between a central unit and a plurality of remote units over distinct twisted pair transmission lines that share a binder is described. Specifically, periodic synchronized upstream and downstream communication periods are provided that do not overlap with one another. That is, the upstream and downstream communication periods for all of the wires that share a binder are synchronized. With this arrangement, all of the very high speed transmissions within the same binder are synchronized and time division duplexed such that downstream communications are not transmitted at times that overlap with the transmission of upstream communications.

In one embodiment, quiet periods are provided to separate the upstream and downstream communication periods. During the quiet period, neither upstream nor downstream communications may be transmitted. In another embodiment, the communication and quiet periods are divided into symbol periods. In this embodiment, the downstream communication periods each include a plurality of symbol periods, the upstream communication periods each include at least one symbol period, and the quiet periods each include at least one symbol period. In one specific embodiment that contemplates a multi-carrier modulation scheme, the downstream communication periods consist of in the range of eight to sixty symbol periods, the upstream communication periods consist of in the range of one to thirty symbol periods and the quiet periods each consist of in the range of one to four symbol periods.

The described invention may be used in conjunction with a wide variety of modulation schemes, including multi-carrier transmission schemes such as Discrete Multi tone modulation (DMT), as well as single carrier transmission schemes such as Quadrature Amplitude Modulation (QAM); Carrierless Amplitude and Phase modulation (CAP); Quadrature Phase Shift Keying (QPSK); or vesigial sideband modulation. It may be used in binders which include wires used to transmit lower speed signals, independent of whether the lower speed signals are time division duplexed and/or synchronized with the high speed signals. This is because standardized lower speed signaling systems tend to operate at lower frequencies which are not as susceptible to near end crosstalk as the higher frequency signals.

The invention has particular advantages in very high performance systems, such as those that contemplate the use of signal carriers having frequencies above approximately 1.0 MHz and those having the capability of transmitting downstream signals at a bit rate of at least ten million bits per second over a each of the distinct transmission lines.

In another aspect, the invention facilitates ready apportionment of upstream data bandwidth to multiple set top units that share a single transmission line. By way of example, in one embodiment, each set top unit may be apportioned a distinct portion of the upstream communication period. In another embodiment, each set top unit may be assigned a distinct portion of the frequency bandwidth for its upstream transmission.

The described method works well regardless of whether the central unit is a central office that originates the communications or is a distribution unit (such as an optical network unit) that receives downstream source signals over one or more trunk lines or the like and transmits information embodied in the downstream source signals as the downstream communication signals. The distribution unit would also transmit information embodied in the upstream communication signals over the optical fibers as upstream source signals.

BRIEF DESCRIPTION OF THE DRAWINGS

The invention, together with further objectives and advantages thereof, may best be understood by reference to the following description taken in conjunction with the accompanying drawings in which:

FIGS. 4a–4d are each graphs illustrating an unsynchronized time domain duplexing transmission scheme for a pair of transmission lines that share the same binder, with solid lines indicating transmission and dotted lines indicating reception;

FIGS. 5a–5d are each graphs illustrating a synchronized time domain duplexing transmission scheme for a pair of transmission lines that share the same binder, with solid lines indicating transmission and dotted lines indicating reception;

DETAILED DESCRIPTION OF THE INVENTION

One generally known bi-directional transmission approach contemplates a time division duplexed (i.e. "ping pong") based data transmission scheme. That is, the downstream signals are first sent using the entire bandwidth. Thereafter, the upstream signals are sent using the entire bandwidth, etc. The applicant's studies suggest that in subscriber line applications, this approach would work reasonably at low frequencies. However, when higher carrier frequencies are used, as for example at carrier frequencies above 1 MHz, near end cross talk between wires that share the same binder 205 begins to significantly degrade the system performance. Thus, at the time of this writing, time division duplexed transmissions have not been proposed for VDSL/FTTC or other subscriber line based very high speed data transmission applications since most such proposed modulation schemes contemplate transmissions in carrier frequency bands significantly above 1 MHz. The present invention overcomes the near end crosstalk problem by synchronizing time division duplexed transmissions for very high speed data transmissions that share a binder.

Figure 1A:
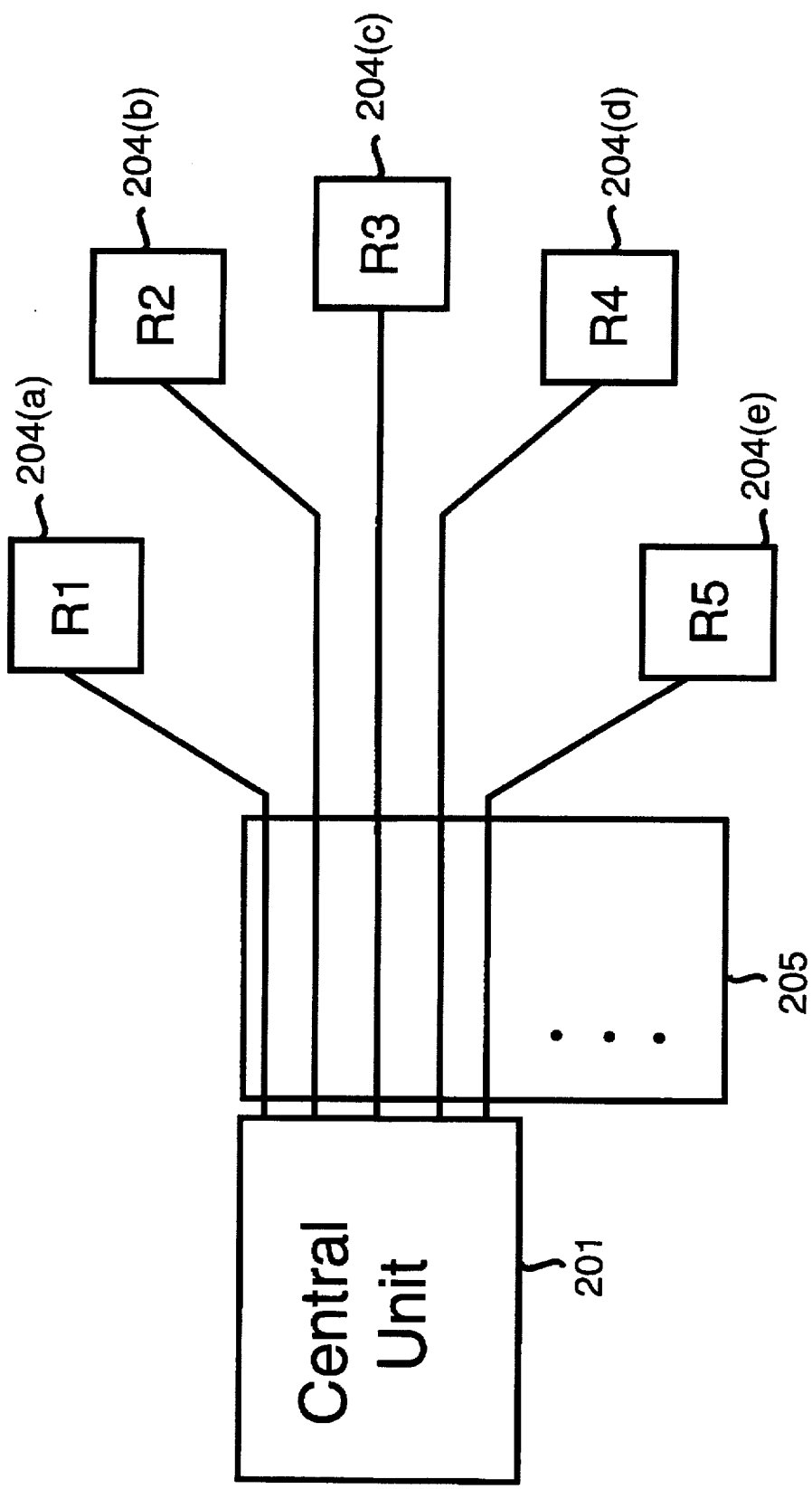
FIG. 1a is a block diagram of a subscriber line based communication system having a plurality of twisted pair phone lines that extend from a central unit to respective remote units.

A typical subscriber line telecommunications local loop is illustrated in FIG. 1a. As seen therein, a central unit 201 communicates with a plurality of remote units $R_1$–$R_N$ over discrete lines, which may take the form of conventional twisted pair phone lines 206. The remote units may be end user units that may exist in a home, office or the like. Typically a number of remote units are serviced by a particular central office. In currently installed systems, the remote units are often telephones, however, they may be fax lines, computer terminals, televisions or a wide variety of other devices capable of connecting to the "phone lines". The central unit 201 may include a transceiver 208 for each line that is functionally broken into a transmitter 209 and a receiver 210.

Figure 1B:
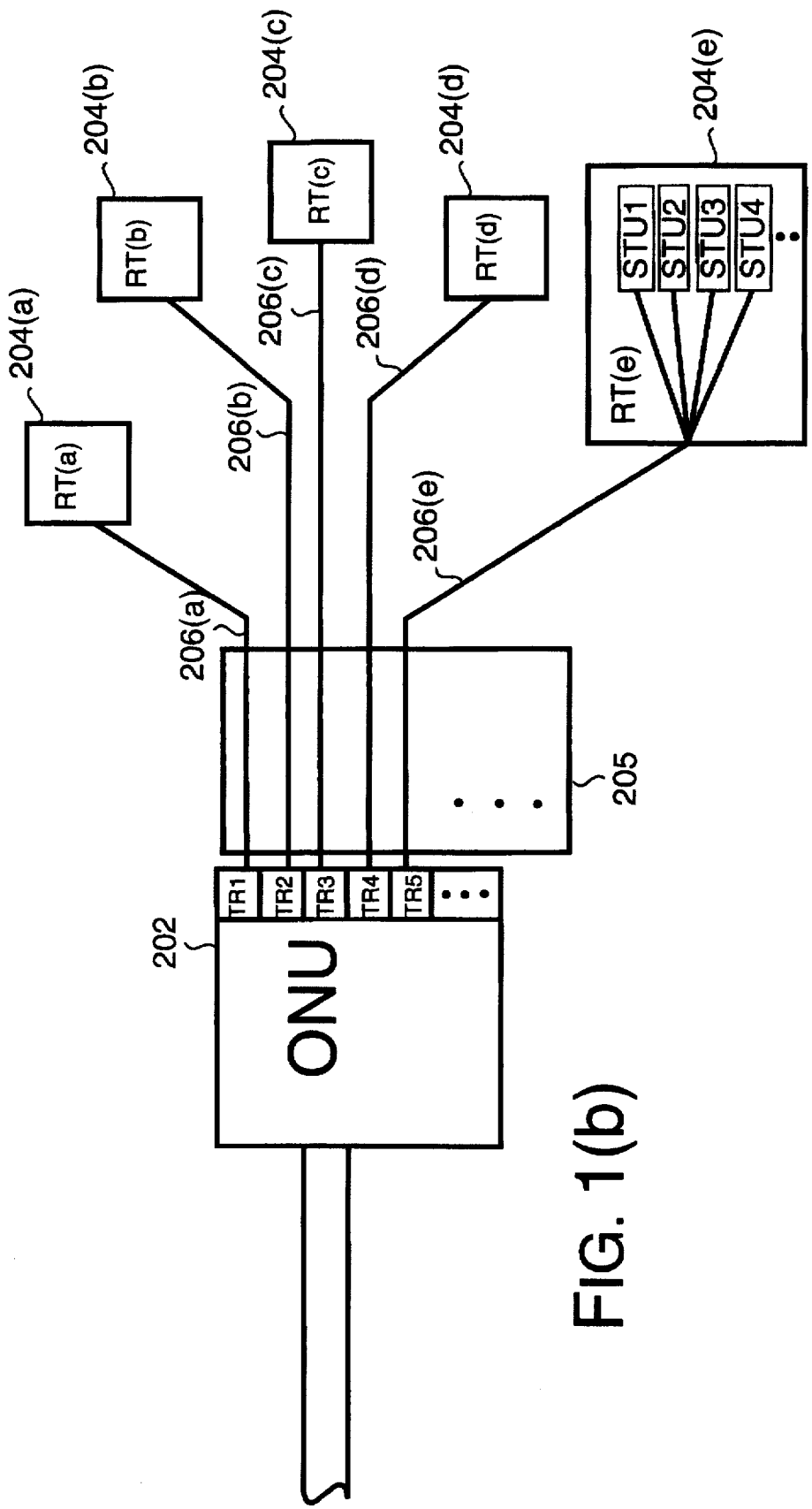
FIG. 1b is a particular case of FIG. 1a in which the central unit takes the form of an optical network unit that acts as a junction between an optical fiber trunk line and a plurality of twisted pair lines.
Figure 2A:
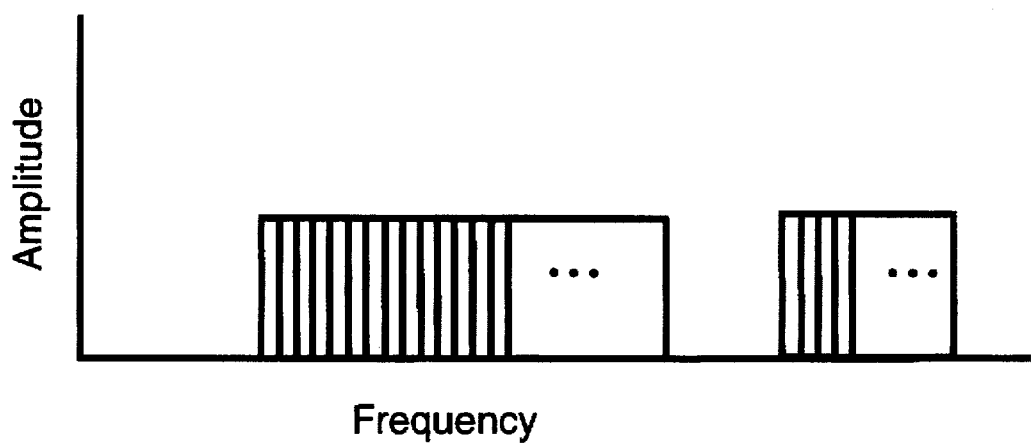
FIGS. 2a and 2b are each graphs illustrating conventional frequency domain duplexing transmission schemes for asymmetric subscriber line transmissions.
Figure 2B:
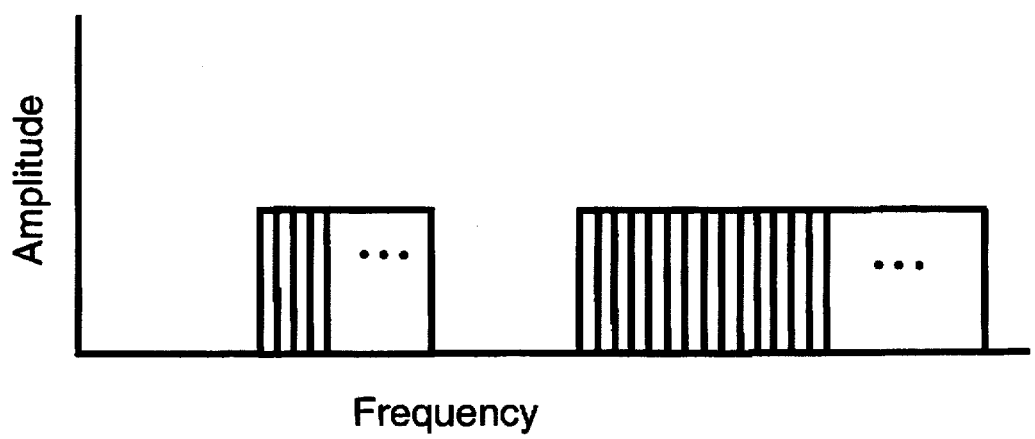

In some embodiments, the central unit is a master server located at a central office that originates the communications. In other embodiments, the "central unit" may be a lower level distribution component in the system architecture that receives and retransmits signals. One embodiment of such a distribution component is illustrated in FIG. 1b. As seen therein, a trunk line 202 terminates at a distribution unit 204. In the embodiment shown, the trunk like takes the form of a fiber optic cable and the distribution unit takes the form of an optical network unit (ONU). The distribution unit 204 communicates with a plurality of remote units $R_1$–$R_N$ over discrete lines, which again, may take the form of conventional twisted pair phone lines 206. As in the previously described embodiment, the remote units may be end user units that may exist in a home, office or the like. Typically a number of remote units are serviced by a particular ONU.

By way of example, in North America, typical ONUs may service on the order of 4 to 96 remote units. In this embodiment, the ONU receives downstream source signals over one or more trunk lines and transmits the information embodied therein to the appropriate remote units as downstream communication signals. Similarly, the ONU receives upstream communication signals from the remotes and transmits the information embodied therein as upstream source signals. The source signals may be passed to a central office, another distribution unit or any other suitable location.

The distance between the central unit 201, 204 and the furthest remote may vary a fair amount. By way of example, it is expected that in the VDSL/FTTC standards, twisted pair loop lengths of up to 1000 feet (300 meters) will be permitted for downstream communications at 51.92 MHz. Similarly, loop lengths of up to 3000 feet (900 meters) may be permitted for downstream communications at 25.96 MHz and loop lengths of up to 5000 feet (1500 meters) may be permitted for downstream communications at 12.97 MHz. As will be appreciated by those skilled in the art, shorter maximum loop lengths generally correspond to higher achievable data rates.

The invention may be applied to a wide variety of data transmission schemes. It is particularly useful in transmission schemes which contemplate significant transmissions at carrier frequencies above 1 MHz. By way of example, in subscriber line applications, the synchronized time division duplexing concept may be applied to both multi-carrier approaches such as Discrete Multi tone modulation (DMT), as well as single carrier approaches such as conventional Quadrature Amplitude Modulation (QAM); Carrierless Amplitude and Phase modulation (CAP); Quadrature Phase Shift Keying (QPSK); and/or vesigial sideband modulation. The described system may also be used in binders which include wires used to transmit lower speed signals, independent of whether the lower speed signals are time division duplexed and/or synchronized with the high speed signals. This is because standardized lower speed signaling systems tend to operate at lower frequencies which are not as susceptible to near end crosstalk as the higher frequency signals. When lower frequency noise or crosstalk presents a problem, the problem frequency bands can often be avoided altogether.

Figure 3A:
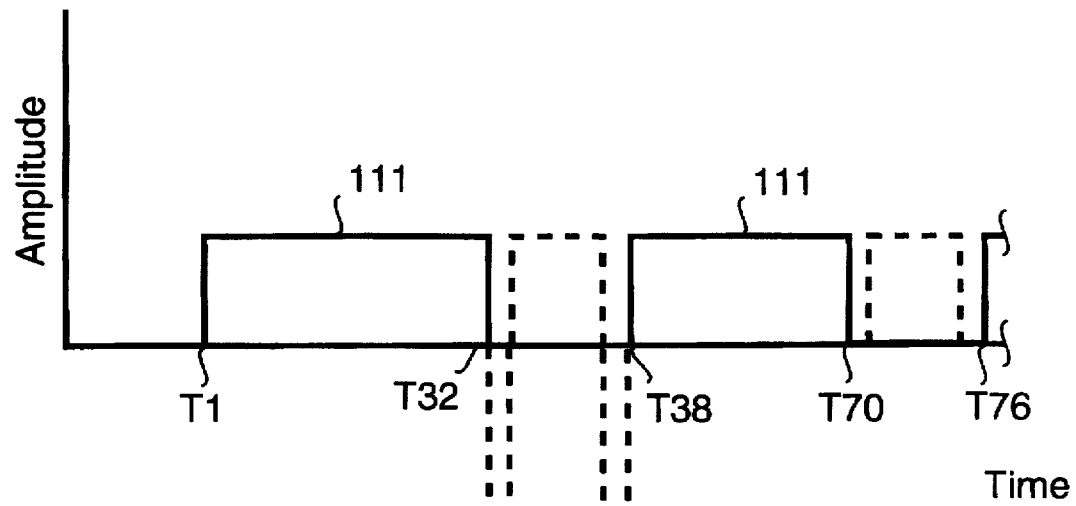
FIGS. 3a and 3b are each graphs illustrating a time domain duplexing transmission scheme for a single line, with FIG. 3a representing downstream communications and FIG. 3b representing upstream communications.
Figure 3B:
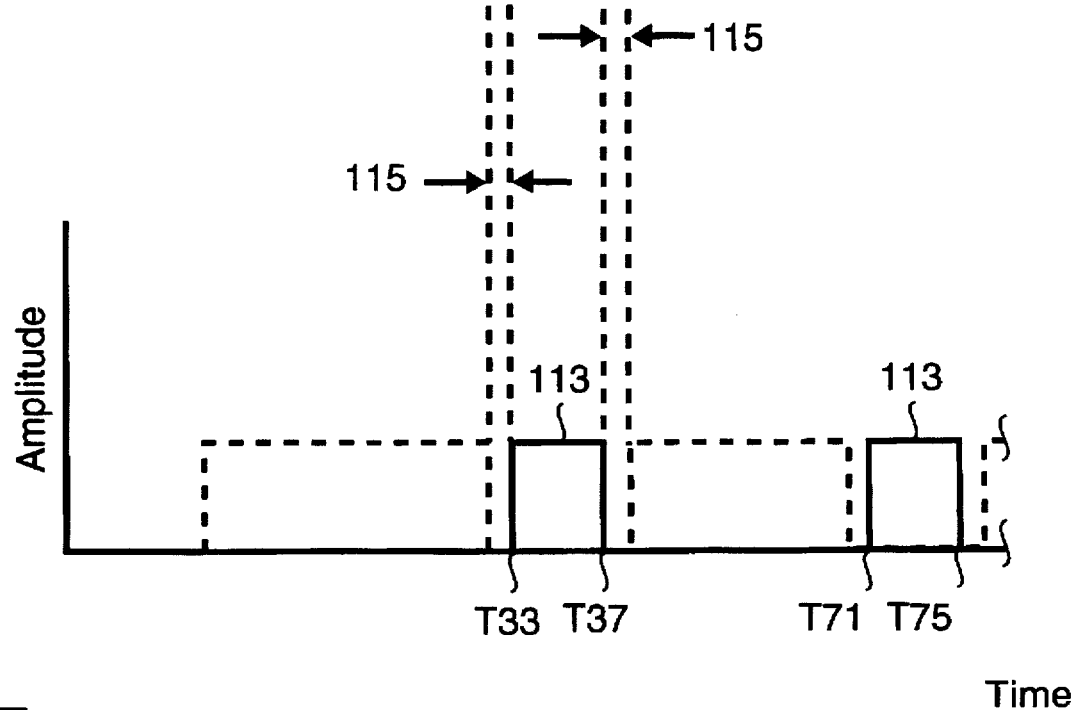

A representative time division duplexing data transmission scheme is illustrated in FIGS. 3(a) and 3(b). As seen therein, the downstream communications (illustrated in FIG. 3(a)), are transmitted during periodic downstream communication periods 111. The upstream communications (illustrated in FIG. 3(b)), are transmitted during periodic upstream communication periods 113 that are interspersed between associated downstream communication periods. In the embodiment shown, quiet periods 115 are provided at each transition between the downstream and upstream communication periods. The combined time from the beginning of a first downstream communication period to the beginning of the next downstream communication period is referred to herein as a "superframe". The actual duration of the upstream, downstream and quiet periods as well as the superframe may all be varied extensively within the scope of the present invention.

Most very high speed data transmission schemes are frame based systems that have discrete symbols. In such systems, the number of symbols that constitute a "downstream communication period", and an "upstream communication period" will typically be integer numbers of symbols. It is easiest for the quiet time to be an integer number of symbols (most typically one), although this is not strictly required. In one described multi-carrier embodiment that utilizes discrete multi-tone transmission, each superframe has at least 12 DMT symbol periods. In such a system, the downstream communication period may be in the range of eight to sixty DMT symbol periods, the upstream communication period may be in the range of one to thirty symbol periods and the quiet times are one to four symbol periods long.

By way of example, in the embodiment shown in FIGS. 3(a) and 3(b) the superframe has thirty eight symbol periods and each quiet period is one symbol period long. Thus, there are thirty-six symbol periods to be divided between the upstream and downstream communications. A typical relationship between downstream and upstream bandwidth in asymmetric applications is 8:1. Such a system is illustrated in the figures, wherein the downstream communication period is thirty-two symbol periods and the upstream communication period is four symbol periods. This will be referred to herein as the 32:1:4:1 embodiment. In a symmetric system, eighteen symbol periods would be apportioned to each of the upstream and the downstream communication periods. That is, an 18:1:18:1 apportionment may be used. Of course, the number of symbol periods apportioned to the upstream communications may vary anywhere from one to eighteen or even more, if the upstream communications need more bandwidth than the downstream communications. Another specific discrete multi-tone example contemplates a twenty symbol superframe. In such systems, 16:1:2:1 or 8:1:8:1 symbol distributions might be used. Of course, the number of symbol periods in each superframe as well as their respective apportionments may be widely varied.

When the symbol rate is 32 KHz, the symbol period is 31.25 microseconds. In a system that has a 32:1:4:1 symbol distribution in a thirty eight symbol superframe with a symbol rate of 32 KHz, the maximum access time for the remotes is 38 symbol periods or approximately 1.2 milliseconds. If shorter access times are required, shorter superframe times may be appropriate. If more upstream bandwidth is required relative to the downstream bandwidth, it may be desirable to reduce the number of symbols allocated to the downstream communications and increase the upstream symbols. If more system bandwidth is desired, it may be advantageous to increase the superframe length or reduce the length of the quiet periods. Indeed, in some applications, it may be desirable to eliminate the quiet periods altogether, although it should be understood that elimination of the quiet period increases the likelihood of interference. It should be appreciated that all of these factors may vary widely in accordance with the needs of a particular system.

It should be appreciated that single carrier transmission schemes typically have substantially shorter symbol periods (that, by way of example, may be on the order of a microsecond). Accordingly, in such systems, a substantially larger number of symbols may be provided in each of the downstream, upstream and quiet periods. By way of example, periods on the order of approximately 1000 to 20,000 symbols for the downstream communication period, 100 to 500 symbols for the quiet periods and 400 to 10,000 symbols for the upstream communication periods may be appropriate.

Referring next to FIGS. 4(a)–4(d), the drawbacks of an unsynchronized system will be described. In the example shown, twisted pair transmission lines 206(a) and 206(b) both transmit time division duplexed discrete multi tone signals. Each line provides a sixteen symbol downstream communication period 111 a two symbol upstream communication period 113 with single symbol quiet periods 115 arranged therebetween. In this embodiment, the communications are not synchronized. Thus, downstream communication transmission on lines 206(a) and 206(b) occurs at the same time as upstream transmission on lines 206(b) and 206(a) respectively and will result in near end crosstalk into both of the distribution unit's associated receivers. Similarly, the upstream transmitters RT(a) and RT(b) will cause (albeit somewhat reduced) near end cross talk into each other's receivers. That is into the receivers at RT(b) and RT(a) respectively. Thus, as illustrated by arrows 217 and 219, the system experiences near end crosstalk, which can significantly hinder system performance.

To overcome this problem, all of the very high speed transmissions that share a binder are synchronized as is illustrated in FIGS. 5(a)-5(d). In the synchronized system, the downstream communication periods 111 all begin and end at the same times, and the upstream communication periods 113 all begin and end at the same time. Such synchronization of the upstream and downstream communication periods effectively eliminates the problems caused by near end crosstalk.

Figure 6:
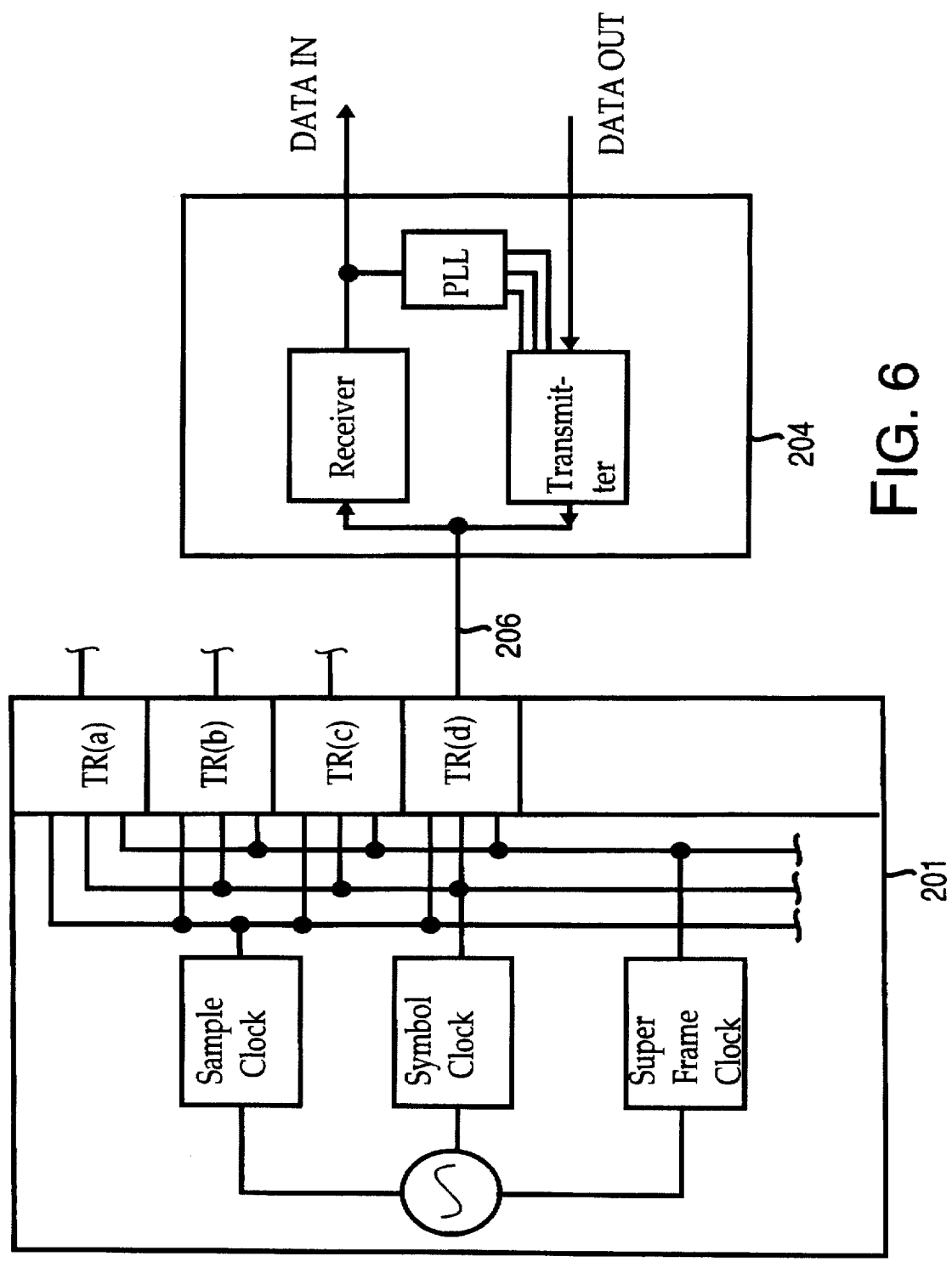
FIG. 6 is a block diagram illustrating a central office and remote modem timing architecture suitable for implementing the synchronization of the present invention.

A modem timing and synchronization arrangement suitable for implementing this type of structure is illustrated in FIG. 6. In the embodiment shown, the synchronization is effected by a master clock unit in the central unit (or ONU) that supplies a super-frame clock to all of the central unit transmitters 209. More specifically, the central unit 201 includes a master oscillator (master clock) 220 that feeds a sample clock 222, a symbol clock 224 and a superframe clock 226. Each of the three clocks 222, 224, 226 provides a single clock signal that is fed to each of the transceivers 208. The transceivers synchronize their respective symbols and superframes based on the inputted clock signals and transmit data downstream to the remote units 204. The remote units 204 each include a receiver 231, a transmitter 233 and a controller 235 that captures the superframe, symbol and sample clocks from the downstream signals and synchronize the upstream signals therewith utilizing any one of a variety of clock recovery methods that are well known to the art. Typically, the controller 235 takes the form of a phase locked loop. Of course, the actual construction of the receiver, the transmitter and the controller may vary a great deal in accordance with the encoding, error correction, and modulation schemes used, etc.

It should be appreciated that the invention can be applied to a wide variety of communication schemes. The Applicant's experience is that modulation schemes that utilize transmissions in carrier frequency bands significantly above 1 MHz are particularly susceptible to near end crosstalk and can benefit the most from the synchronization. Most modulation techniques that are being considered for VDSL/FTTC and other applications that require bit rates over 10 Mbit/s contemplate the use of carrier frequencies above 1.5 MHz and can benefit greatly from the present invention. It is noted that in many applications, some lines that share a binder will be used to carry very high speed transmissions using modulation techniques that can benefit the most from the describe synchronization scheme, while other lines will be carrying conventional low speed signals. Since near end cross-talk is not generally a serious problem at carrier frequencies below approximately 1 MHz such communications will not significantly interfere with the high speed, or high carrier frequency time division duplexed signal that utilize the synchronization of the present invention.

One very desirable feature of VDSL/FTTC system is that one twisted pair should be able to provide multiplexed communications to multiple set top units (referred to as STUs) within a single customer premise. Each of the set top units receives, demodulates and decodes the full downstream signal, and selects whatever is addressed to it. Each STU transmitter must also be granted access to the shared upstream channel. Each STU may be granted access in successive time periods; this is known as Time Division Multiple Access (TDMA). Alternatively, each STU may be assigned separate frequency bands; this is known as Frequency Division Multiple Access (FDMA). Both TDMA and FDMA are well known in the art, but they have usually been combined with frequency division duplexing for separating the downstream and upstream signals. However, the present invention is well adapted for handling the assignment of upstream bandwidth in such multi-point to point upstream communications. The coordination of the upstream signals from multiple STUs is known as Media Access Control (MAC). By way of example, the information for this media access control may be included as an overhead in the downstream signal using methods well known in the art.

As an example of TDMA, consider an embodiment in which four STUs share a single line as illustrated by remote 204(e) of FIG. 1b. In an embodiment that uses a 32:1:4:1 symbol use pattern, each STU can be assigned a designated one of the upstream symbols. In embodiments which have more upstream symbol periods available than STUs, specific STUs can be allocated multiple upstream symbol periods. In embodiments which have more STUs than upstream symbol periods, a slightly more complicated media access control routine would assign symbols less frequently than once per super-frame. As an example of FDMA, consider an embodiment in which a plurality of STUs share a single line as illustrated by remote 204(e) of FIG. 1b. One preferred embodiment uses a 16:1:2:1 symbol use pattern, and during the upstream communication period each STU would be assigned a number of sub-carriers (when using discrete multi-tone modulation) or a frequency sub-band (when using single-carrier modulation) in accordance with its data transmission needs. Typically, it is desirable to interleave the sub-carriers assigned to each STU to reduce the probability that low bandwidth noise significantly impairs the ability of one of the STUs to communicate with the central unit. Of course, such interleaving of the allotted sub-carriers is not required.

Although the present invention has been described only as it applies to a few modulation schemes, it should be understood that the present invention may be embodied in many other specific forms without departing from the spirit or scope of the invention. For instance, although the specification has described its use in VDSL/FTTC and other subscriber line based very high speed data transmission systems, it may be used in other systems which experience near end crosstalk as well. In the primary embodiment, the invention's application to a system which utilizes a discrete multi tone modulation scheme has been described. However, it can readily be used in systems which use other modulation techniques as well. By way of example, Quadrature Amplitude Modulation (QAM); Carrierless Amplitude and Phase modulation (CAP); Quadrature Phase Shift Keying (QPSK); and/or vesigial sideband modulation may all be used. Importantly, the invention may be used even if different modulation techniques are used on lines that share the same binder. When high carrier frequency signals are transmitted using different modulation techniques, it is important only that their time division duplexed upstream and downstream communication periods be synchronized. When lower carrier frequency signals are transmitted over adjacent wires that share a binder, signals that are time division duplexed and synchronized will be carried well independent of whether the lower carrier frequency signals are time division duplexed and/or synchronized with the high speed signals. This is because standardized lower speed signaling systems tend to operate at lower frequencies which are not as susceptible to near end crosstalk as the higher frequency signals.

Further, it should be appreciated that the invention can be implemented using a wide variety of modem constructions at both the central and remote station locations. Therefore, the present examples are to be considered as illustrative and not restrictive, and the invention is not to be limited to the details given herein, but may be modified within the scope of the appended claims.

What is claimed is:

1. In a subscriber line based communication system that facilitates bi-directional data transmission between a central unit and a plurality of remote units over distinct transmission lines that share a binder, a method of coordinating data transmissions comprising the steps of:

providing periodic downstream communication periods during which the central unit may transmit information to the plurality of remote units;

providing periodic upstream communication periods during which the plurality of remote units may transmit information to the central unit, the upstream communication periods being arranged such that they do not overlap with the downstream communication periods, whereby data transmissions within the binder are time division duplexed and synchronized such that the transmissions within the binder are transmitted in only one direction at a time.

2. A method as recited in claim 1 further comprising the step of providing quiet periods that separate the upstream and downstream communication periods, wherein neither upstream nor downstream communications are transmitted during the quiet period.

3. A method as recited in claim 1 wherein the downstream communication periods each include a plurality of symbol periods and the upstream communication periods each include at least one symbol period.

4. A method as recited in claim 3 further comprising the step of providing quiet periods that separate the upstream and downstream communication periods, and wherein:

neither upstream nor downstream communications are transmitted during the quiet period;

both the upstream communications and the downstream communications are Discrete Multi-tone modulated signals; and the downstream communication periods consist of in the range of eight to sixty symbol periods, the upstream communication periods consist of in the range of one to thirty symbol periods and the quiet periods each consist of in the range of one to four symbol periods.

5. A method as recited in claim 4 wherein the downstream communication period is thirty two symbols long, the upstream communication period is four symbols long and the quiet periods are each one symbol long.

6. A method as recited in claim 5 wherein a selected one of the remote units includes four set top units, wherein each set top unit is apportioned a distinct one of the upstream communication period symbols periods.

7. A method as recited in claim 3 wherein a selected one of the remote units includes a plurality of set top units, wherein each set top unit is apportioned at least one distinct one of the upstream communication period symbols periods.

8. A method as recited in claim 1 wherein both the upstream communications and the downstream communications are Carrierless Amplitude and Phase modulated signals.

9. A method as recited in claim 1 wherein both the upstream communications and the downstream communications are Quadrature Phase Shift Keying modulated signals.

10. A method as recited in claim 1 wherein both the upstream communications and the downstream communications are vesigial sideband modulated signals.

11. A method as recited in claim 1 wherein both the upstream communications and the downstream communications are Quadrature Amplitude Modulation modulated signals.

12. A method as recited in claim 1 wherein the upstream and downstream communications associated with a first selected one of the transmission lines utilize different modulation schemes.

13. A method as recited in claim 1 wherein the downstream communications associated with selected first and second ones of the transmission lines utilize different modulation schemes.

14. A method as recited in claim 1 wherein:

an additional transmission line that shares the same binder as the distinct transmission lines is arranged to transmit non-time division duplexed signals at carrier frequencies that are below approximately 1 MHz; and all transmissions over transmission lines within the binder that are at frequencies above approximately 1 MHz are time division duplexed and synchronized.

15. A method as recited in claim 1 wherein the time division duplexed data transmission include a signal carried on carrier frequencies above approximately 1.0 MHz.

16. A method as recited in claim 1 wherein the time division duplexed data transmissions have the capability of transmitting downstream signals at a bit rate of at least ten million bits per second over each of the distinct transmission lines.

17. A method as recited in claim 1 wherein the central unit is an optical network unit that:

receives downstream source signals over at least one optical fiber and transmit information embodied in the downstream source signals as downstream communication signals wherein the downstream communication signals are only transmitted during the downstream communication period; and transmits information embodied in upstream communication signals that are received during the upstream communication periods over the optical fibers as upstream source signals.

18. A method as recited in claim 1 wherein transmission lines are unshielded twisted pair transmission lines.

19. A method as recited in claim 1 wherein:

the downstream communication periods are defined by a master clock in the central unit; and each of the remote units synchronize their upstream communication periods based on the timing of downstream communication signals transmitted during at least one of the downstream communications periods.

20. A method as recited in claim 1 wherein a selected one of the remote units includes a plurality of set top units, wherein each set top unit is apportioned a distinct frequency range during the upstream communication period.

21. A central modem suitable for use in a subscriber line based communication system that facilitates communications between the central modem and a plurality of remote units over distinct transmission lines that share a binder, the central modem comprising:

a plurality of transceivers, each transceiver being arranged to communicate with an associated remote unit over an associated distinct transmission line that share a binder using a time division duplexed transmission scheme;

a synchronizing unit arranged to coordinate the signals transmitted by the plurality of transceivers such that the transceivers only transmit information to their associated remote units during synchronized downstream communication periods; and wherein the transceivers are arranged to receive information from their associated remote units during synchronized upstream communication periods, the upstream communication periods being arranged such that they do not overlap with the downstream communication periods, whereby data transmissions within the binder are time division duplexed and synchronized such that the transmissions within the binder are transmitted in only one direction at a time.

22. A central modem as recited in claim 21 wherein the synchronizing unit outputs a super-frame clock signal to each of the transceivers to facilitate coordination of the upstream and downstream communication periods.

23. A central modem as recited in claim 22 wherein the synchronizing unit further outputs a symbol clock signal and a sample clock signal to each of the transceivers to further facilitate coordination of the upstream and downstream communication periods.

24. A central modem as recited in claim 21 wherein the synchronizing unit includes:

a super-frame clock that outputs a super-frame clock signal to each of the transceivers;

a symbol clock that outputs a symbol clock signal to each of the transceivers; and a sample clock that outputs a sample clock signal to each of the transceivers; and wherein the clock signals are used by the transceivers to coordinate the upstream and downstream communication periods.

25. A central modem as recited in claim 21 wherein at least one of the transceivers is arranged to both transmit and receive Quadrature Phase Shift Keying modulated signals.

26. A central modem as recited in claim 21 wherein at least one of the transceivers is arranged to both transmit and receive Carrierless Amplitude and Phase modulated signals.

27. A central modem as recited in claim 21 wherein at least one of the transceivers is arranged to both transmit and receive Vestigial Sideband modulated signals.

28. A central modem as recited in claim 21 wherein at least one of the transceivers is arranged to both transmit and receive Quadrature Amplitude Modulation modulated signals.

29. A central modem as recited in claim 21 wherein at least one of the transceivers is arranged to both transmit and receive Discrete Multi-tone modulated signals.

30. A central modem as recited in claim 21 wherein a first one of the transceivers is arranged to utilize a different modulation scheme than a second one of the transceivers.

31. A central modem as recited in claim 21 wherein the central modem is arranged to insure that all transmissions over transmission lines within the binder that are at frequencies above approximately 1 MHz are time division duplexed and synchronized and each transceiver has the capability of transmitting downstream signals at a bit rate of at least ten million bits per second.

32. A central modem as recited in claim 21 wherein the central modem is an optical network unit that:

receives downstream source signals over at least one optical fiber and transmit information embodied in the downstream source signals as downstream communication signals, wherein the downstream communication signals are only transmitted during the downstream communication period; and transmits information embodied in upstream communication signals that are received during the upstream communication periods over the optical fibers as upstream source signals.

33. An optical network unit arranged to receive downstream source signals over at least one optical fiber and transmit information embodied in the downstream source signals over twisted pair lines to a plurality of remote units using distinct transmission lines that share a binder, the optical network unit comprising:

a plurality of transceivers, each transceiver being arranged to communicate with an associated remote unit over an associated distinct transmission line that share the binder using a time division duplexed transmission scheme that utilizes Discrete Multi-tone modulated signals;

a synchronizing unit arranged to coordinate the signals transmitted by the plurality of transceivers such that the transceivers only transmit information to their associated remote units during synchronized downstream communication periods, the synchronizing unit being arranged to output, a symbol clock signal, a sample clock signal, and a super-frame clock signal to each of the transceivers; and wherein the transceivers are arranged to receive information from their associated remotes during synchronized upstream communication periods, the upstream communication periods being arranged such that they do not overlap with the downstream communication periods, whereby data transmissions within the binder are time division duplexed and synchronized such that the transmissions within the binder are transmitted in only one direction at a time.

34. A modem suitable for use in a subscriber line based communication system that facilitates communications between a central unit and a plurality of remote units over distinct transmission lines that share a binder, the modem comprising:

a transmitter suitable for transmitting upstream communication signals from the modem to a central unit over a designated transmission line;

a receiver suitable for receiving downstream communication signals from the central unit over the designated transmission line; and a controller for detecting a sample clock signal, a symbol clock signal and a super-frame clock signal in the downstream communication signals and synchronizing the upstream communication signals transmitted by the transmitter with the downstream communication signals such that the upstream and downstream communication signals are time division duplexed, whereby the modem's upstream communication signals are synchronized with upstream communication signals transmitted by other remote units that communicate with the central unit over distinct transmission lines that share a binder with the designated transmission line, whereby data transmissions within the binder are time division duplexed and synchronized such that the transmissions within the binder are transmitted in only one direction at a time.

35. A designated remote unit for use in a subscriber line based communication system that facilitates communications between a central unit and a plurality of remote units over distinct transmission lines that share a binder, the designated remote unit comprising:

a plurality of set top units each including a modem as recited in claim 34, wherein each of the plurality of set top units are arranged to share the designated transmission line.

36. A modem as recited in claim 34 wherein the transmitter is arranged to transmit Carrierless Amplitude and Phase modulated signals and the receiver is arranged to receive Carrierless Amplitude and Phase modulated signals.

37. A modem as recited in claim 34 wherein the transmitter is arranged to transmit Quadrature Phase Shift Keying modulated signals and the receiver is arranged to receive Quadrature Phase Shift Keying modulated signals.

38. A modem as recited in claim 34 wherein the transmitter is arranged to transmit Vestigial Sideband modulated signals and the receiver is arranged to receive Vestigial Sideband modulated signals.

39. A modem as recited in claim 34 wherein the transmitter is arranged to transmit Quadrature Amplitude Modulation modulated signals and the receiver is arranged to receive Quadrature Amplitude Modulation modulated signals.

40. A modem as recited in claim 34 wherein the transmitter is arranged to transmit Discrete Multi-tone modulated signals and the receiver is arranged to receive Discrete Multi-tone modulated signals.

41. In a subscriber line based communication system that facilitates bi-directional data transmission between an optical network unit and a plurality of remote units over distinct twisted pair transmission lines that share a binder the bi-directional data transmissions being made using a Discrete Multi-tone scheme capable of achieving data transmission rates of at least ten million bits per second over each of the distinct twisted pair transmission lines, a method of coordinating data transmissions comprising the steps of:

providing periodic downstream communication periods during which the central unit may transmit information to the plurality of remote units, each downstream communication period including a multiplicity of symbol periods;

providing periodic upstream communication periods during which the plurality of remote units may transmit information to the central unit, each upstream communication period including a plurality of symbol periods, the upstream communication periods being arranged such that they do not overlap with the downstream communication periods, whereby data transmissions within the binder are time division duplexed and synchronized such that the transmissions within the binder are transmitted in only one direction at a time.

42. A method as recited in claim 41 further comprising the step of providing quiet periods that separate the upstream and downstream communication periods, and wherein:

neither upstream nor downstream communications are transmitted during the quiet period;

the downstream communication periods consist of in the range of eight to sixty symbol periods, the upstream communication periods consist of in the range of one to thirty symbol periods and the quiet periods each consist of in the range of one to four symbol periods.

43. A method as recited in claim 42 wherein:

an additional twisted pair transmission line that shares the same binder as the distinct twisted pair transmission lines is arranged to transmit non-time division duplexed signals at carrier frequencies that are below approximately 1 MHz; and all transmissions over transmission lines within the binder that are at frequencies above approximately 1 MHz are time division duplexed and synchronized.

* * * * *